(12) United States Patent
Sachdev et al.

(10) Patent No.: US 10,820,063 B2
(45) Date of Patent: Oct. 27, 2020

(54) MANIFEST CUSTOMIZATION IN ADAPTIVE BITRATE STREAMING

(71) Applicant: ARRIS Enterprises LLC, Suwanee, GA (US)

(72) Inventors: Jaspreet Sachdev, Brampton (CA); Christopher Ptacek, Beaverton, OR (US); Zhan Hong Liau, Richmond Hill (CA); Bhavesh Patel, Mississauga (CA); Parasuram Ranganathan, Brampton (CA); Sean Michael Sheedy, Lake Oswego, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/617,329

(22) Filed: Jun. 8, 2017

(65) Prior Publication Data
US 2017/0359628 A1 Dec. 14, 2017

Related U.S. Application Data

(60) Provisional application No. 62/348,169, filed on Jun. 10, 2016.

(51) Int. Cl.
*H04N 21/235* (2011.01)
*H04N 21/81* (2011.01)
(Continued)

(52) U.S. Cl.
CPC ....... *H04N 21/812* (2013.01); *H04N 21/2353* (2013.01); *H04N 21/23439* (2013.01);
(Continued)

(58) Field of Classification Search
CPC .. H04N 21/812; H04N 21/435; H04N 21/858; H04N 21/235; H04N 21/2668;
(Continued)

(56) References Cited

U.S. PATENT DOCUMENTS 9,691,068 B1 * 6/2017 Azari .................. G06Q 30/00
2012/0072286 A1 * 3/2012 Kilar .................. H04N 21/812
705/14.55

(Continued)

*Primary Examiner* — Pankaj Kumar
*Assistant Examiner* — Alexander Boyd
(74) *Attorney, Agent, or Firm* — Chernoff, Vilhauer, McClung & Stenzel, LLP

(57) ABSTRACT

A method receives a manifest for video requested by a client device. The manifest including links for different versions of the video for the client device to use to request segments of the different versions of the video based on conditions detected by the client device. A placeholder in the manifest is selected based on a configuration specifying the placeholder as a trigger to insert alternate content into the manifest. The method then selects a metadata payload based on the configuration specifying the placeholder and a source of the metadata payload and dynamically inserts the metadata payload into the manifest at a position based on the placeholder. The metadata payload is added with an identifier from the configuration that identifies the metadata payload to the client device. The manifest is outputted with the metadata payload for use by the client device while playing the video.

20 Claims, 6 Drawing Sheets

(51) Int. Cl.
*H04N 21/435* (2011.01)
*H04N 21/858* (2011.01)
*H04N 21/2343* (2011.01)
*H04N 21/44* (2011.01)
*H04N 21/262* (2011.01)

(52) U.S. Cl.
CPC ..... *H04N 21/26258* (2013.01); *H04N 21/435* (2013.01); *H04N 21/44016* (2013.01); *H04N 21/858* (2013.01)

(58) Field of Classification Search
CPC ......... H04N 21/26258; H04N 21/2353; H04N 21/23439; H04N 21/44016; G06Q 30/0241; G06Q 30/0242; G06Q 30/0272
See application file for complete search history.

(56) References Cited

U.S. PATENT DOCUMENTS

| | | | |
|---|---|---|---|
| 2013/0094590 A1* | 4/2013 | Laksono | H04N 21/435 375/240.25 |
| 2014/0040026 A1* | 2/2014 | Swaminathan | G06Q 30/02 705/14.53 |
| 2014/0150019 A1* | 5/2014 | Ma | H04N 21/812 725/34 |
| 2015/0277939 A1* | 10/2015 | Johnson | G06F 9/44505 717/121 |
| 2015/0334431 A1 | 11/2015 | Bjordammen et al. | |
| 2016/0142387 A1* | 5/2016 | Lockhart | H04L 63/061 713/171 |
| 2016/0300259 A1* | 10/2016 | Bashetty | H04N 21/812 |
| 2017/0026437 A1* | 1/2017 | Wang | H04N 21/26258 |
| 2017/0332113 A1* | 11/2017 | Haritaoglu | H04N 21/234 |

* cited by examiner

Manifest
   300
303
   Advertisement Link #1
       302                              304
301
   imprURL={{.SERVER_RESPONSE.XPATH[./ vmap/VASTAdData/VAST/inLine/
   Creatives/Impression]}},
                      308                310
306
   trk_complete_URL={{.SERVER_RESPONSE.XPATH[./vmap/VASTAdData/VAST/
   inLine/Creatives/TrackingEvents/Tracking@event="complete"]}},
               314                                          316
312
   trk_midoint_URL={{.SERVER_RESPONSE.XPATH[./vmap/VASTAdData/VAST/
   inLine/Creatives/TrackingEvents/Tracking@event="midpoint"]}}
305
   Advertisement Link #2

FIG. 3

402              404
{{.SERVER_RESPONSE.XPATH[.xpath]}}|{{.CONFIG.variable
_name}}

MANIFEST CUSTOMIZATION IN ADAPTIVE BITRATE STREAMING

CROSS REFERENCE TO RELATED APPLICATIONS

The present disclosure claims priority to U.S. Provisional App. No. 62/348,169, entitled "ABR Manifest Customization", filed Jun. 10, 2016, the contents of which is incorporated herein by reference in its entirety.

BACKGROUND

An Internet Protocol (IP) video delivery network based on adaptive streaming techniques can provide many advantages, such as greater flexibility, reliability, lower integration costs, new services, and new features. Adaptive streaming, also known as adaptive bitrate (ABR) streaming, is a delivery method for streaming video over Internet Protocol to media players at client devices. Adaptive bitrate streaming streams video across computer networks where the source video is encoded at multiple bitrates (resulting in different quality levels). Client devices monitor the network and media player resources to determine which bitrate to request when streaming content. The client device can switch to different bitrates depending on the state of these resources, such as by switching to a higher bitrate when the client device detects there is available bandwidth in the network.

Adaptive bitrate streaming uses a manifest file that includes links, such as Uniform Resource Locators (URLs), that client devices use to request segments of a video. The client devices can switch between bitrates by selecting a link for a different bitrate. In general, the modification of the manifest file is limited.

BRIEF DESCRIPTION OF THE DRAWINGS

FIG. 3 shows an example of metadata payload for a placement start event that is inserted into a manifest according to one embodiment.

FIG. 4 depicts an example of a syntax for an either/or scenario that can be used according to one embodiment.

DETAILED DESCRIPTION

Described herein are techniques for an adaptive bitrate streaming system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments generate a manifest for adaptive bitrate (ABR) streaming. The manifest may include links for different bitrates of a video and/or lines for segments of the video for each of the bitrates. Particular embodiments provide techniques for customizing and extending the manifest (e.g., adding a metadata payload) at a position in the manifest dynamically during runtime. For example, when a request for a manifest is received, particular embodiments may dynamically retrieve a metadata payload. Then, particular embodiments can insert the metadata payload at a position in a manifest when generating the manifest during runtime. The insertion of the metadata payload may be within alternate content of the video being played. The alternate content may be advertisements and/or blackout content (e.g., content played during a blackout of an event). The dynamic runtime insertion allows customers to customize the metadata payload included in a manifest upon receiving the request from the client device. For example, a real-time status of information from the manifest generation service, an ad engine, the client device, the manifest itself, or other metadata payload entities may be available to be inserted at a position in the manifest. Further, particular embodiments may allow the insertion of the metadata payload for multiple customers without having to create customized metadata formats for each customer. Rather, each customer can use a configuration syntax to define which metadata payload to insert in the manifest.

Figure 1:
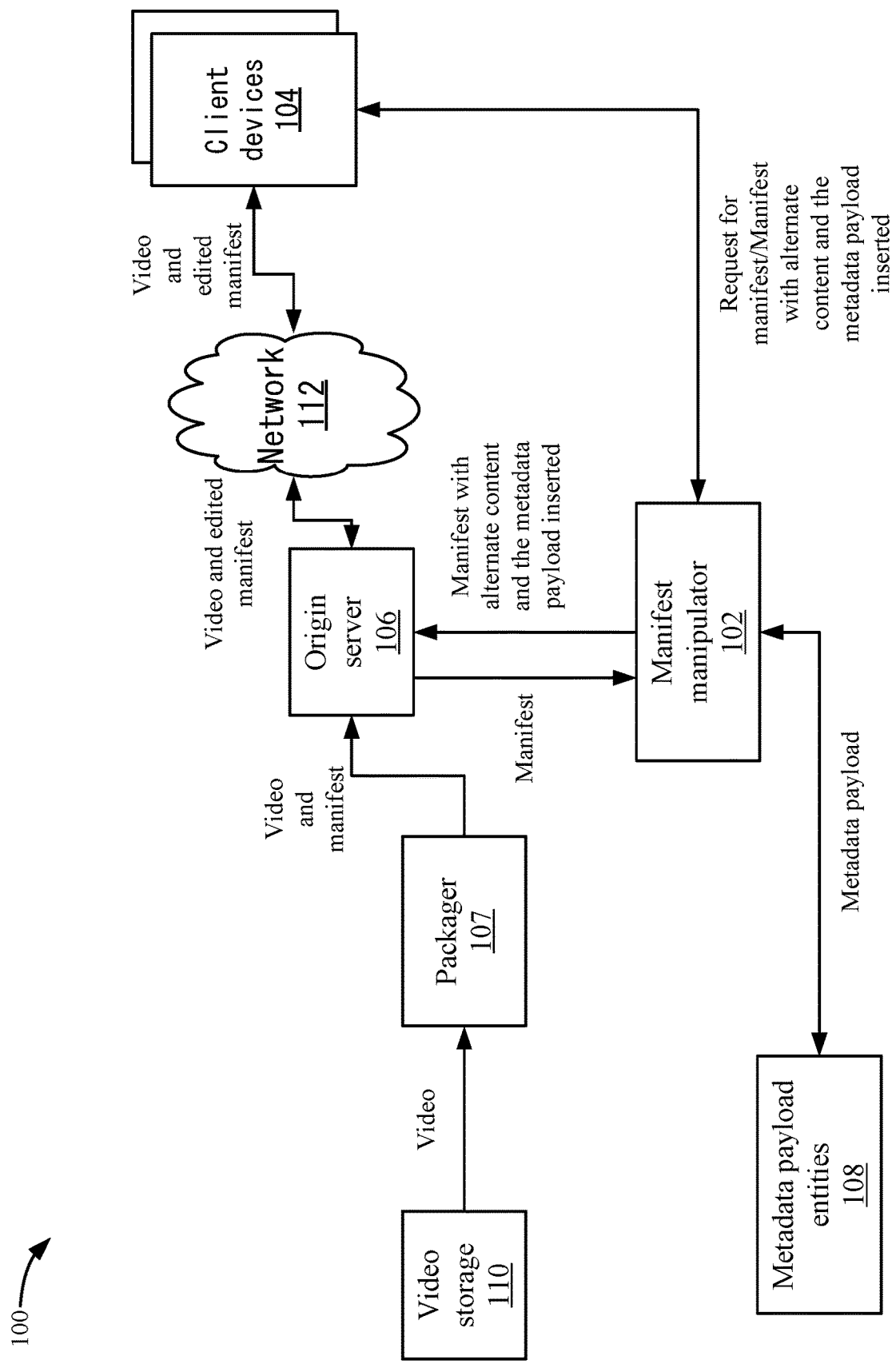
FIG. 1 depicts a simplified system of a method for manipulating a manifest according to one embodiment.

FIG. 1 depicts a simplified system 100 of a method for manipulating a manifest according to one embodiment. System 100 includes a manifest manipulator 102, client devices 104, an origin server 106, metadata payload entities 108, video storage 110, and a network 112. Other entities may also be appreciated in system 100, such as cache servers that may cache video segments and manifests. In one embodiment, manifest manipulator 102 is located within origin server 106, and in another embodiment, manifest manipulator 102 may be included on a server separate from origin server 106.

Client devices 104 may request videos, such as for a live stream or a stored stream. A live stream may be video that is being produced and sent live whereas stored videos may be requested on-demand. A video may include multimedia content, such as video and/or audio. Within the video, alternate content may be played, which may be advertisements and/or blackout content. The alternate content may be inserted into the video dynamically during runtime.

Adaptive bitrate streaming uses a manifest to identify the available bitrates for content. For example, a first step may include selecting a link to one bitrate, such as selecting among low, medium, and high bitrates. Then, client device 104 can select links for each segment of the video at the selected bitrate. Client device 104 can then change bitrates based on the current conditions being experienced through network 112.

Client device 104 may send a request to manifest manipulator 102 to generate a manifest for a video. Manifest manipulator 102 may receive a manifest for the video requested, such as from origin server 106 or packager 107. In one embodiment, the manifest may be separated into a first manifest that lists only the bitrates that are available for the video. Once client device 104 selects one of the bitrates, then another manifest for that bitrate is provided to client device 104. The manifest for the bitrate includes the links for segments associated with that bitrate for the video. When discussed, the manifest may be either of the manifests discussed. Further, the manifest may include both the identification of the available bitrates and the links for the segments for each available bitrate.

The manifest may also include events that may be identified by placeholders. The placeholders may be identifiers, such as strings (e.g., a string of characters) that identify the event and a position in the manifest. Manifest manipulator 102 may use the events to determine positions within the manifest in which alternate content may be inserted. When an event is detected, manifest manipulator 102 may retrieve the metadata payload from different sources, such as metadata payload entities 108 (e.g., an ad engine), the manifest generation service, the client device, and the manifest itself. Examples of metadata payload may include information that is inserted into the manifest dynamically in the alternate content, such as links that can track the viewing of ads when an advertisement is inserted into the manifest at a placeholder. Although insertion within alternate content is discussed, the metadata payload may be inserted in other places within the video. The different types of metadata payload that can be inserted into manifests will be discussed in more detail below.

Manifest manipulator 102 may return the edited manifest with the alternate content and metadata payload to client devices 104 directly. Alternatively, manifest manipulator 102 may send the edited manifest to origin server 106, which sends the manifest to client devices 104.

Adaptive Bitrate Streaming

The manifest manipulation is performed in an adaptive bitrate streaming environment, which will be described before the manifest manipulation. Client device 104 is capable of providing streaming playback by requesting an appropriate series of segments from system 100 over an Internet Protocol content delivery network (CDN) (e.g., network 112). ABR streaming relies on a packager 107 (e.g., encoders and segmenters) to provide multiple different bitrates for the same video (resulting in different quality levels of the same video). Client devices 104 monitor the network and media player resources to determine which bitrate to request when streaming video. Client device 104 can switch to different bitrates depending on the state of these resources, such as switching to a higher bitrate when available bandwidth is high and a lower bitrate when available bandwidth is low.

Client device 104 may be associated with a user or a subscriber and includes a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Origin server 106 and client devices 104 implement video compression techniques, such as those described in the standards defined by MPEG-2, MPEG-4, ITU-T H.263 or ITU-T H.264/MPEG-4, Part 10, Advanced Video Coding (AVC), High Efficiency Video Coding (HEVC), and extensions of such standards, to transmit and receive digital video information more efficiently.

The video provided to client devices 104 may be in the form of a live stream, such as from a live content backbone, or a stored stream, such as a network digital video recorder (nDVR) video storage or a VOD video storage. The live content backbone may be any number of possible cable or content provider networks and manners for distributing video (e.g., satellite, fiber, the Internet, etc.). The example live content backbone is a non-limiting example of a content source for adaptive bitrate streaming, which may include any number of multiple service operators (MSOs), such as cable and broadband service providers who provide both cable and Internet services to subscribers, and operate content delivery networks in which Internet Protocol (IP) is used for delivery of television programs (i.e., IPTV) over a digital packet-switched network.

An adaptive bitrate system, such as system 100, uses adaptive streaming to deliver content to client devices 104. Adaptive streaming, also known as ABR streaming, is based on a series of short progressive downloads applicable to the delivery of both live and on demand content. Adaptive bitrate streaming works by breaking the overall media stream into a sequence of small file downloads, each download loading one short segment of an overall potentially unbounded transport stream.

With adaptive bitrate streaming, a source video is encoded at different bitrates and then split into small media segments by packager 107. Generally, packager 107 is responsible for communicating with each client/subscriber and preparing ("packaging") individual adaptive bitrate streams. Packager 107 is designed to segment media files and to encapsulate those files in a container expected by the particular type of adaptive bitrate client device 104. Thus, a whole video may be segmented into segments. The adaptive bitrate segments are available at different bitrates, each of a finite duration. Packager 107 generates or identifies the media segments of the requested video.

ABR streaming may be based on a series of short Hypertext Transfer Protocol (HTTP) progressive downloads applicable to the delivery of both live and on demand content. ABR systems can use HTTP as the transport protocol and client device 104 can perform a media download as a series of very small files. The video is cut into many small segments and encoded into the desired formats. As used herein, a segment is a chunk that is a small file containing a short video segment along with associated audio and other data. In some cases these segments may be standalone files, or may be sections (i.e., byte ranges) of one much larger file. For simplicity the term 'segment' is used to refer to both of these cases (many small files or fewer large files).

Adaptive streaming may use the Hypertext Transfer Protocol (HTTP) as the transport protocol for these video segments. For example, 'segments' or 'segment files' may be short sections of media (e.g., 2 to 10 second sections of media) retrieved in an HTTP request by an adaptive bitrate client. Client device 104 may use HTTP transfer to download each media segment URL.

Client device 104 may submit a request for video via network 112. Network 112 may be a content delivery network (CDN) that can deliver adaptive bitrate file segments from a service provider or headend to client devices 104. Network 112 can be communicatively coupled between an origin server 106 (or web server) and client device 104, and may include one or more distribution nodes and/or content delivery servers (e.g., edge servers, or edge cache/streaming servers). The user, via a respective client device 104, is responsible for retrieving the media file 'segments,' or portions of media files, from origin server 106 as needed to support the subscriber's desired playback operations.

Along with the delivery of video, packager 107 creates and delivers manifest files. ABR streaming involves the use of a manifest to identify the available bitrates for the video. The manifest may also include metadata for the video itself or metadata associated with a particular ABR client device 104 (e.g., if a specific manifest is issued per client). Packager 107 may create the manifest files as the packager performs the segmenting operation for each type of adaptive bitrate streaming method. In adaptive bitrate protocols, the manifest files generated may include a variant playlist and a playlist file. The variant playlist describes the various formats (resolution, bitrate, codec, etc.) that are available for a given video. The variants in the manifest may be ordered based on increasing resolution in the variant playlist. A client device 104 may begin with the 1st variant playlist, or the lowest resolution, when beginning playback of a new ABR stream. Depending on network and resource conditions, client device 104 may increment through the ordered variant playlists to in the order of the increasing resolution, working up to the highest bitrate variant playlist. For each variant, a corresponding playlist file in a playlist manifest may be provided. The playlist file identifies the media file segments that are available to client device 104. It is noted that the terms manifest and playlist files may be referred to interchangeably herein. Also, manifest may be a variant playlist or playlist file. However, for discussion purposes, the manipulation of the manifest may be with the playlist file. In operation, client device 104 determines which variant the client desires, as listed in the variant playlist, receives the corresponding playlist file, and then retrieves media segments referenced in the playlist file.

Each available bitrate may be associated with a playlist file and contain a list of available media segments for that respective bitrate. The available media segments are listed in time order with the earliest media segments present in the manifest corresponding to the start of content, and the media segments at the end corresponding to the end of content. Each media segment within the playlist files includes a unique URL that corresponds to the actual storage location of the multimedia content for the specific interval the media segment covers.

Packager 107 creates the manifest files to be compliant with an adaptive bitrate streaming format of the associated media and also compliant with encryption of media content under various digital rights management (DRM) schemes. Depending on the type of video being streamed, the manifest files may be prepared differently. For example, for video with a known duration, the set of manifest files (with different bitrates) may include the complete set of required media segments to play the entire video. Client device 104 that is playing this video may retrieve the manifest initially, then requests segments from the different bitrate playlist files depending on the network and compute resources available. As described above, the variant playlists may be ordered in the manifest file in increasing resolution/quality. Client device 104 may move up and down through the variant playlists when selecting appropriate resolution video quality segments.

The media segments listed in the different playlist files may all be aligned using a common media segment sequence number. For example, media segment sequence numbers typically increment. Thus, if client device 104 needs to switch bitrates, client device 104 can download the required media segment sequence number identified in a different playlist file. The switchover between consecutive segments, regardless of the bitrate they are encoded with, is seamless, although the multimedia quality (predominantly video) is likely to change. Depending on the number of available encoded bitrates, the quality change may vary. Audio may be encoded with multimedia media segments, or may by encoded and available as a separate flow of audio media segments. The sequence numbers of media segments carrying multimedia content and any audio content are synchronized.

Adaptive bitrate streaming methods have been implemented in proprietary formats including HTTP Live Streaming ("HLS") by Apple, Inc., and HTTP Smooth Streaming by Microsoft, Inc. adaptive bitrate streaming has been standardized as ISO/IEC 23009-1, Information Technology—Dynamic Adaptive Streaming over HTTP ("DASH"): Part 1: Media presentation description and segment formats. Although references are made herein to these example adaptive bitrate protocols, it will be recognized by a person having ordinary skill in the art that other standards, protocols, and techniques for adaptive streaming may be used.

In HLS, for example, origin server 106 receives a media request from client device 104 and generates or fetches a manifest file to send to client device 104 in response to the request. A manifest file can include links to media files as relative or absolute paths to a location on a local file system or as a network address, such as a URL path. In HLS, an m3u8 format is used as a non-limiting example to illustrate the principles of manifest files including non-standard variants.

At the start of a streaming session, client device 104 may receive the manifest file, which contains metadata for the various variants that are available. The initial request may be for the manifest file that includes the variant playlist(s). Subsequent requests may be specific to a playlist file that includes the media segment URLs. Upon receiving the manifest file, client device 104 parses the manifest file and selects the variant playlist file. Client device 104 then determines the segments to request based on the links in the playlist file.

Client device 104 can fetch a first media segment posted to origin server 106 for playback from a selected playlist file in the manifest file. For example, client device 104 may use HTTP Get or byte range requests to request media segments. Then, during playback of that media segment, client device 104 may fetch a next media segment for playback after the first media segment, and so on until the end of the media content. This process continues for as long as the video is being played (until the video completes or the user stops or pauses playback). When packager 107 completes the manifests, once client device 104 retrieves each bitrate playlist file for a particular video, client device 104 is not required to retrieve the playlists again for the duration of the playback of the video identified in the manifest.

Playback at client device 104 of the content in an adaptive bitrate environment, therefore, is enabled by the playlist file that directs client device 104 to the media segment locations, such as a series of URLs. For example, each URL in a playlist file is usable by the client to request a single HTTP segment. The playlist file may reference live content or on demand video. Other metadata also may accompany the playlist file.

For live content, which has no set duration, the manifest files may be prepared differently than for stored content. For example, for live video the manifest file may be continually updated as live video is being made available. Packager 107 provides a subset of media segments, based on the most recently encoded set of available media segments in the manifest, to origin server 106. Each manifest may include anywhere from 10 media segments up to 60 media segments (or more). Packager 107 refreshes the manifest files for every new media segment produced, which based on the media segment duration, e.g., every 2 to 4 seconds. Similar to the client device 104 in the previous example, client device 104 retrieves the variant playlist and picks a bitrate playlist suitable for the network and compute resources available. However, as the bitrate playlist is constantly being updated by packager 107, client device 104 is generally required to periodically retrieve the most appropriate bitrate playlist in order to gain knowledge of the next available media segments. Note that some ABR streaming protocols include metadata to algorithmically determine the next available media segment URL, saving client device 104 from this constant retrieval overhead. However, sometimes the playlist file contains per media player DRM keying information that applies to the next media segment, resulting in client device 104 having to request the playlist file repeatedly, e.g., one for every new segment.

As described above, after segmenting, the segments and manifest files (list of segments) are placed on a content delivery network server, such as published to origin server 106. The content delivery network logic may store the media segments according to an internal heuristic logic algorithm, determining whether and where to store the video. For example, more popular videos may be stored in local storage to decrease network bandwidth usage and increase access speed. Less popular videos may be stored in a central repository to reduce costs for fast storage. For example, videos that may be stored includes on demand and network DVR videos. Live non-DVR video segments may be distributed by the content delivery network but not stored.

It is noted that an ABR system may rely on URLs to uniquely identify every individual media segment, also sometimes referred to as RESTful URLs. These URLs may maintain state information within the actual URL string enabling intermediate HTTP proxy/caches to be deployed throughout the CDN network. The intermediate HTTP proxy/caches may automatically cache any ABR segment that passes through the proxy, making it available for all subsequent requests that are received by that proxy. Such HTTP caching may automatically result in the distributed storage of ABR segments within the CDN without having to employ any explicit heuristic logic algorithm.

The use of an adaptive bitrate system that segments media files allows the client to switch between different quality (size) segments of a given asset, as dictated by network performance. Client device 104 has the capability by using the manifest file, to request specific segments at a specific bitrate. As the stream is played, client device 104 may select from the different alternate streams containing the same material encoded at a variety of data rates, allowing the streaming session to adapt to the available data rate. For example, if, in the middle of a session, network performance becomes more sluggish, client device 104 is able to switch to the lower quality stream and retrieve a smaller segment. Conversely, if network performance improves the client is also free to switch back to the higher quality segments.

A benefit of ABR streaming is that client devices 104 can react to varying network condition, and choose streaming bitrates that fit within the available network bandwidth. During the start of an ABR streaming session, client devices 104 may begin with the lowest encoded bitrate in order to "sense" the network conditions and download media segments from the corresponding bitrate manifest. For example, generally client device 104 begins with the first variant playlist listed within a manifest file, the first variant playlist often the lowest resolution version of the requested content. If the network conditions allow (and other client resources are available) client device 104 can attempt to switch to the next highest bitrate available for the next ABR media segment. For example, during the start of an ABR streaming session, client device 104 retrieves the master manifest for the ABR stream, and identifies the lowest bitrate media manifest. It retrieves the media manifest, and begins requesting media segments from the list of available segments. Depending on how aggressive client device 104 is, client device 104 may skip a next higher available bitrate to an even higher resolution playlist. Client device 104 is not bound by a strict order of variant playlists in the master manifest file. Similarly, the client device may drop to a much lower bitrate in the event network/resource conditions change drastically.

Since adaptive bitrate media segments are available on the adaptive bitrate system in one of several bitrates, client device 104 may switch bitrates at the media segment boundaries. Using the manifest file to adaptively request media segments allows client device 104 to gauge network congestion and apply other heuristics to determine the optimal bitrate at which to request the media presentation segments/fragments from one instance in time to another. As conditions change the client is able to request subsequent fragments at higher or lower bitrates. Thus, the client can adjust its request for the next segment. The result is a system that can dynamically adjust to varying network congestion levels. Often, the quality of the video stream streamed to a client device is adjusted in real time based on the bandwidth and computer processing unit (CPU) of client device 104. For example, client device 104 may measure the available bandwidth and request an adaptive bitrate media segment that best matches a measured available bitrate.

Packager 107 may be configured to perform segmentation for either all output adaptive bitrate formats or a subset of the output adaptive bitrate streaming formats. Packager 107 may create the respective manifest files. The segment durations may be different for each adaptive bitrate format, but they will all have to be an integer multiple of the GOP size or key frame intervals. However for a given adaptive bitrate format the segment durations will be the same for all streams in an output stream group.

Various ABR streaming protocols identify segment download strategies, in advance of any playout strategies. For live streaming, where the manifest gets updated constantly as newly encoded media segments are made available, client device 104 attempts to download the most recent media segments in order to fill its play-out buffer. Most client devices when starting try to download the three or four most recent media segments and then play from the oldest segment, mostly in an effort to prevent playback stalls from occurring.

Client device 104 may maintain a temporary cache of a few segments and requests further segments at optimally determined rates thus maintaining continuity of playback even through changing network bandwidth conditions. For example, origin server 106 may store several segment sizes for each segment in time. Client device 104 can predict the available bandwidth and requests the best segment size, e.g., using the appropriate URL. Since client device 104 is controlling when the content is requested, this is seen as a client-pull mechanism, compared to a push mechanism where the server pushes the content. Using URLs to create the manifest file enables very simple client devices to retrieve segments using web browser-type interfaces.

Manifest Manipulation

Manifest manipulator 102 may be deployed on a server side and is responsible for alternate content insertion within the manifest (e.g., the variant playlist). Further, manifest manipulator 102 may retrieve and insert a metadata payload into the manifest. This service is deployed on a server side with origin server 106 and communicates with metadata payload entities 108, such as an ad server, the manifest, the manifest service, or the client device, using protocols like Society of Cable Telecommunications Engineers (SCTE) and Video Ad Serving Template (VAST) to retrieve the ABR content (e.g., advertisements) that needs to be spliced into the manifest. Also, manifest manipulator 102 is responsible for servicing client device's HTTP requests for manifests per different ABR protocols.

Manifest manipulator 102 also manages manipulates the manifest file for client devices 104 to insert the metadata payload along with the alternate content. The metadata payload that is inserted may be customized per deployment and customer. Increasing the variations of inserted metadata payload into a manifest may be desirable. For example, support for many formats, such as more than ten predefined metadata formats, by manifest manipulator 102 may be desirable, as may be support for customizable manifest files. In one example, the metadata payload may be used by a media player of client device 104 for a client side content impression and tracking purposes.

As disclosed herein, manifest manipulator 102 may enable providing different metadata payloads more efficiently. Manifest manipulator 102 may reduce or eliminate static modes, though embodiments disclosed may include maintenance of existing modes or static modes for backward compatibility. The static modes are where metadata formats for each customer were statically defined in manifest manipulator 102.

Manifest manipulator 102 may create a customized manifest at runtime for each client device 104. The customized manifest may include alternate content that is inserted into the manifest at certain positions in between segments of a video. Additionally, manifest manipulator 102 may retrieve the metadata payload in real-time, such as from metadata payload entities 108, and insert the metadata payload into the manifest dynamically with the advertisements.

The manifest generated includes placeholders that mark events for the streaming of the video. For example, the placeholders may be insertion points in which manifest manipulator 102 can insert advertisements. In some embodiments, manifest manipulator 102 can insert advertisements with the metadata payload, but the advertisements do not need to be inserted with the metadata payload. Also, when advertisements are discussed, other alternate content may be inserted, such as blackout content. In one embodiment, the advertisements that are inserted include links in which client device 104 could use to request the advertisements, such as from an advertisement server. The metadata payload may be retrieved from metadata payload entities 108, which may include entities such as client devices 104, the manifest itself, or the service provided by manifest manipulator 102. In one example, the metadata payload may include a link that is used by client device 104 for ad impression and tracking purposes. For example, the metadata payload may cause client device 104 to provide information that indicates how much of an advertisement was watched at client device 104 for ad impression purposes.

The placeholders may be metadata defining an event and the placeholders may include two properties, payload and position. In the traditional use, manifest manipulator 102 may insert a defined payload at the placeholder, such as an advertisement at a position based on the placeholder. The alternate content may extended by insertion of the metadata payload by manifest manipulator 102 at a position indicated by the placeholder. By using the placeholders, manifest manipulator 102 allows inserted metadata payload to vary among different customers. For example, manifest manipulator 102 may support multiple defined formats from different customers to customize the manifest files. The placeholders may reduce or eliminate static modes in which the manifest includes static metadata that is customized for each customer.

Figure 2:
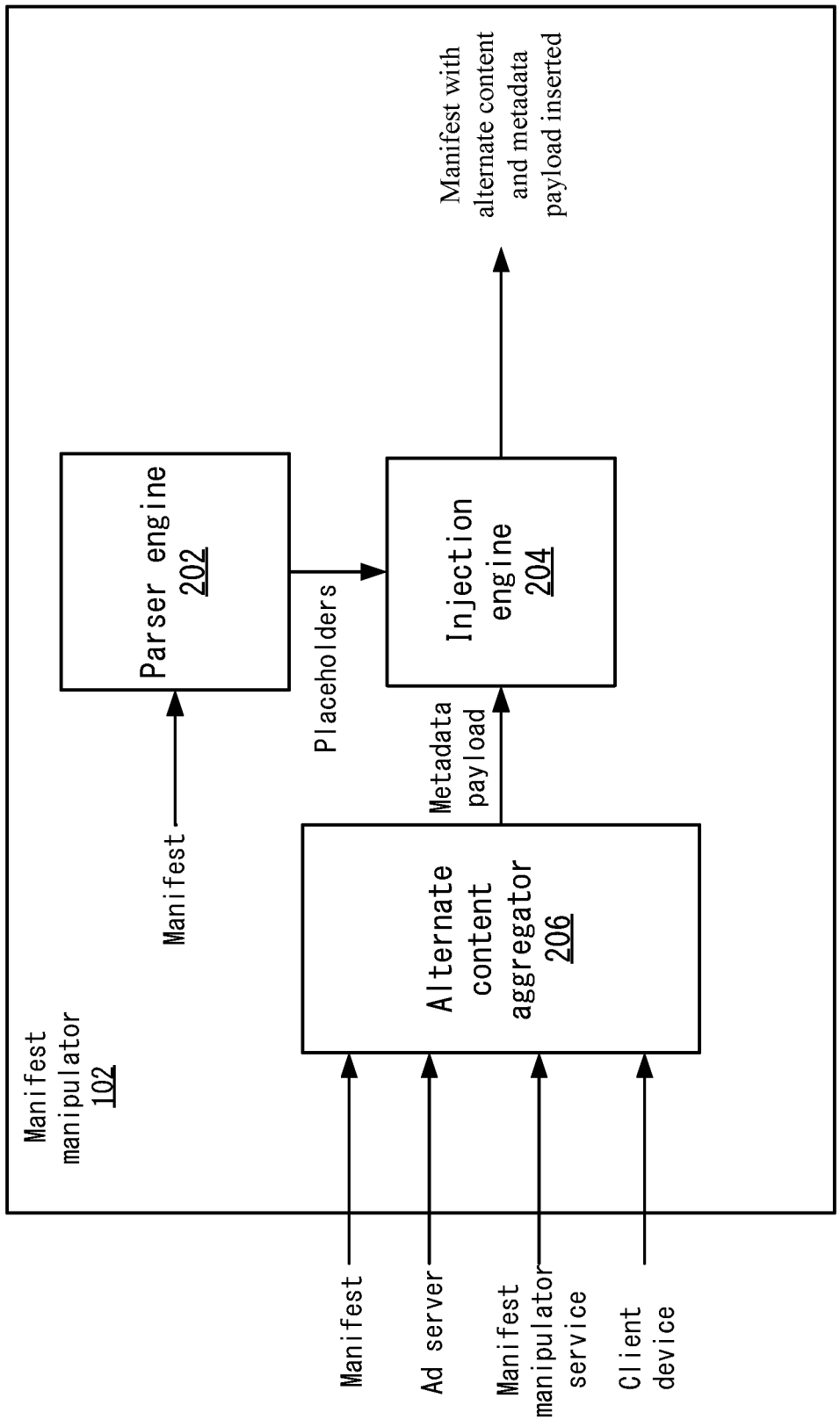
FIG. 2 depicts a more detailed example of a manifest manipulator according to one embodiment.

FIG. 2 depicts a more detailed example of manifest manipulator 102 according to one embodiment. Manifest manipulator 102 includes a parser engine 202, an injection engine 204, and metadata payload aggregator 206. Parser engine 202 receives a manifest that includes placeholders. The placeholders may identify different events that may occur. Parser engine 202 may parse the manifest to determine the placeholders. Then, alternative content that can be inserted in a position associated with the placeholder.

Injection engine 204 can then insert the metadata payload into the manifest based on the placeholders. In addition to the metadata payload, injection engine 204 may also insert advertisements if appropriate. In one embodiment, injection engine 204 inserts a link for an advertisement in addition to the metadata payload for a placeholder.

The placeholders may be standardized in a protocol used for the adaptive bitrate streaming. In one embodiment, the placeholders may include, but are not limited to: placement start, placement end, placement opportunity start, placement opportunity end, and end of session events. In one embodiment, these placeholders are included in the manifest to indicate events.

The placement opportunity start may be where an ad break starts in the video. The placement opportunity end may be where the advertisement may end. An ad break may include multiple advertisements each defined by the placement start and placement end placeholders. The placement start placeholder may be where an advertisement may be inserted in the manifest. The placement end placeholder may define when an advertisement ends in the ad break. There could be multiple placement start and placement end placeholders in an ad break. The end of session placeholder may indicate the end of a streaming session, such as the end of the content. Although these placeholders are described, other placeholders may be used.

A customer may customize the metadata payload that is inserted into the manifest using a configuration. The configuration may identify placeholders and specify metadata payload that can be inserted based on identifying the placeholders in the manifest. Using the configuration and standardized placeholders allows different customers to customize the manifest without having a service provider statically define each customer's configuration. Rather, the service provider can use injection engine 204 to dynamically insert the metadata payload associated with the placeholders for different customers.

Manifest manipulator 102 may expose information of the manifest manipulator service, information in the manifest received, information at client device 104, and information of an ad engine as possible metadata payload for insertion into the manifest. Manifest manipulator 102 is configured to pull the information from the above sources using an metadata payload aggregator 206.

The configuration for generating the payload for insertion into the manifest (e.g., the ad segment URL and the metadata payload payload) may contain special identifiers to retrieve information from various data points. This may minimize software upgrades to the manifest manipulator service when changing the format of the payloads. The special identifiers for configuration address the above statuses.

One identifier may reference elements from ad engine or ad service response that may be protocol specific to the ad protocol used. In one embodiment, the syntax may be: {{.SERVER_RESPONSE.XPATH[xpath]}}. This identifier is "SERVER_RESPONSE" and references a server response path "XPATH[xpath]" from an ad server that can be used to retrieve the metadata payload. The identifier SERVER_RESPONSE means the external ad server. Any data within the ad server response as indicated by the link "xpath" can be used. In one embodiment, the xpath will work for any external service implementing an extensible markup language (XML) based response, but XML does not need to be used.

Another type of identifier may reference the configuration of service provided by manifest manipulator 102. This allows support for the static configuration to be part of the metadata payload. This syntax may be as follows: {{.CONFIG.variable_name}}. The identifier CONFIG indicates that a value for "variable_name" from the configuration of manifest manipulator should be used to determine metadata payload.

Another type of identifier may reference information from the manifest that is received. For example, the configuration information may reference signaling information in the manifest that can be used to determine the metadata payload. For example, tags may reference ingress manifest variables that are currently parsed by manifest manipulator 102. The syntax may be {{.MANIFEST.variable_name}}. The identifier MANIFEST indicates that a value for a "variable_name" from the manifest should be used to determine metadata payload.

Another type of identifier may reference information from client device 104. For example, the identifier may reference a playback URL (e.g., a media segment URL) to access the incoming client device information, such as a client device URL directory structure or parameters. The syntax for the URL parameter may be: {{.CLIENT_URL.PARAM[parameter_name]}}. The identifier CLIENT_URL.PARAM indicates that a value for a "parameter_name" from the client playback URL should be used to determine the metadata payload. Also, the syntax for an arbitrary regular expression for data within a URL may be: {{.CLIENT_URL.REGEX[regular_expression]}}. This allows the configuration to specify regular expressions that can be used to select information that matches the regular expression in the information from the client device as the metadata payload. The identifier CLIENT_URL.REGEX indicates that a regular expression of "regular_expression" that matches information from the client playback URL should be used to determine the metadata payload.

The configuration will provide name-value pairs of information for the identifiers described above. For example, manifest manipulator 102 is configured by the configuration to recognize a tag name within the placeholder. When the tag name is recognized, the tag value is used to select which information to insert. The metadata payload is then generated using the data selected.

The configuration allows for the custom data format to be entered for each of the placeholders based on which identifiers are used. For example, FIG. 3 shows an example of a metadata payload for a placement start event that is inserted into a manifest 300 according to one embodiment.

At 301, manifest manipulator 102 may insert an impression URL in the manifest that tracks whether a user at client device 104 watched an advertisement. The impression URL may be inserted in between advertisement links for an advertisement #1 at 303 and an advertisement #2 at 305. At 302, an identifier for a server response is shown as "SERVER_RESPONSE.XPATH" and at 304, the value for this identifier is a value represented by the path "[./vmap/VASTAdData/VAST/inLine/Creatives/Impression/]". The value may be inserted for a tracking URL that is inserted as metadata payload for the identifier that client device 104 can select when the advertisement is watched. The URL contacts a service that records the ad impression.

At 306, manifest manipulator 102 may insert a tracking complete URL in the manifest that tracks whether a user at client device 104 completed watched an advertisement to the end. At 308, an identifier for a server response is shown as "SERVER_RESPONSE.XPATH" and at 310, the value for this identifier is represented by the path [./vmap/VASTAdData/VAST/inLine/Creatives/TrackingEvents/Tracking@event="complete"]". The value may be inserted for a tracking URL that is inserted as metadata payload for the identifier that client device 104 can select if the advertisement is watched to the end. The URL contacts a service that records that the advertisement was completely watched.

At 312, manifest manipulator 102 may insert an impression URL in the manifest that tracks whether a user at client device 104 watched an advertisement to a midpoint of the advertisement. At 314, an identifier for a server response is shown as "SERVER_RESPONSE.XPATH" and at 316, the value for this identifier is represented by a path "[./vmap/VASTAdData/VAST/inLine/Creatives/TrackingEvents/Tracking@event="midpoint"]". The value may be inserted for a tracking URL that is inserted as metadata payload for the identifier that client device 104 can select when the advertisement is watched to or past a midpoint. The URL contacts a service that records that the advertisement was watched to the midpoint.

The above metadata payload may be retrieved based on a response from the ad server. For example, the response from the ad server may include the XPATH elements that are included in the manifest.

The configuration may also provide for encoding of the metadata payload in different formats, e.g., zip, base64. Such different formats can be extended (e.g., the format encoding type can be easily extended to support other types).

The configuration for the metadata payload may also provide an either/or scenario. This allows manifest manipulator 102 to build the metadata payload from different data points just in case the data listed in the configuration is not available. For example, the value for the identifier can be included from a manifest manipulator service response and a fallback included in the configuration if the manifest manipulator service response XML element is not present in the manifest manipulator configuration. FIG. 4 depicts an example of a syntax for an either/or scenario that can be used according to one embodiment. At 402, the identifier for the server response is shown. In this case, if the metadata payload is received from the server response, then it could be inserted into the manifest. At 404, a configuration variable name is provided that could be used to insert information from the configuration of the service provided by manifest manipulator 102 if the server response is not received.

Referring back to FIG. 2, injection engine 204 may inject the metadata payload based on the placeholders in the manifest and the configuration identifiers. The metadata payload that is injected may be associated with the name value pairs described above. Manifest manipulator 102 may insert a different metadata payload for each event. For example, Manifest manipulator 102 may use a configuration to recognize a name of "Acds" within a placeholder. A manifest line may be:

EXT-X-SPLICE—
EXIT:SignalId=159172,Splice Type=opportunity,
Feed=simulive,Network=simulive,AP=ABR1,u tc=2017-02-21T00:06:01.875Z,timeFromSignal=0, streamID=1,test1=live2,Acds=live2

Manifest manipulator 102 would read the name "Acds" and select the value of "live2". This value is used to select the ad server named "live2" to retrieve data for insertion in the manifest. This can be further refined by an additional layer of mapping in the manifest manipulator configuration, redirecting the generic "live2" to another manipulator instance-specific ad server name such as "ServerV3.2".

Figure 5:
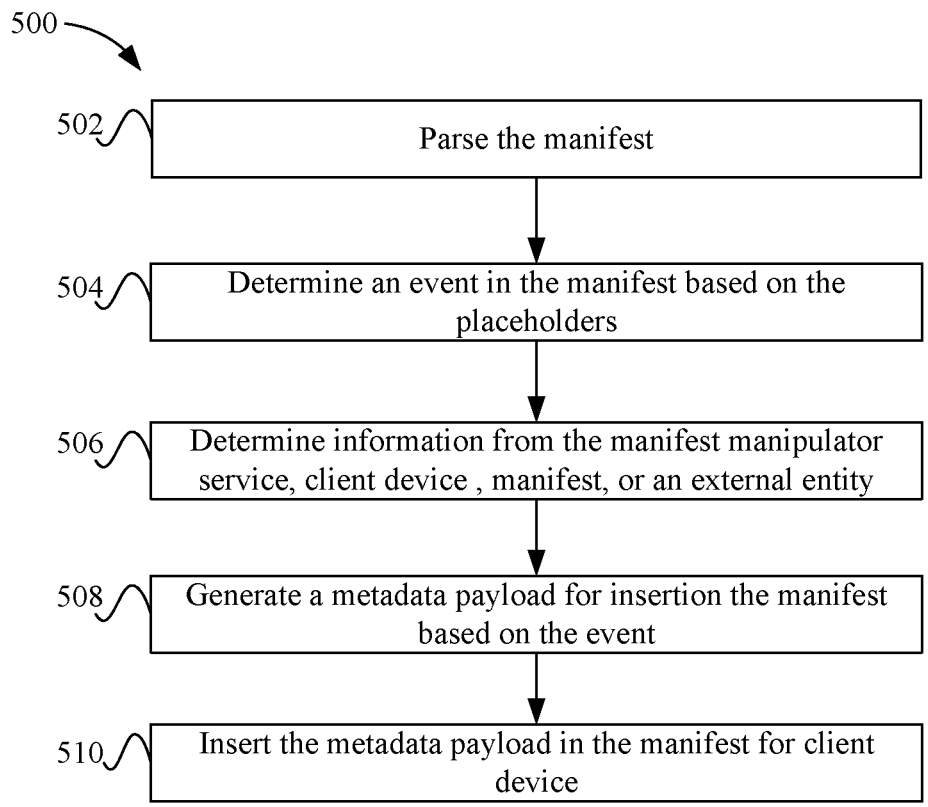
FIG. 5 depicts a simplified flowchart of a method for inserting metadata payload according to one embodiment.

FIG. 5 depicts a simplified flowchart 500 of a method for inserting the metadata payload according to one embodiment. At 502, manifest manipulator 102 parses the manifest. For example, manifest manipulator 102 identifies placeholders for events in the manifest. At 504, manifest manipulator 102 determines an event in the manifest based on the placeholders. The event may be the start and end of ad breaks or ad opportunities.

At 506, manifest manipulator 102 determines information specific to the manifest manipulator service, client device 104, manifest, or an external entity 108, such as an ad server. The information is included in one of the specific entities and specified in the configuration for the metadata payload.

At 508, manifest manipulator 102 generates the metadata payload for insertion the manifest based on the event. Manifest manipulator 102 determines the metadata payload from the information from server 101, the manifest, client device 104 and/or external entity 108. The metadata payload may be defined in the format of name value pairs.

At 510, manifest manipulator 102 inserts the metadata payload in the manifest for client device 104. For example, the metadata payload may be inserted into a position in the manifest associated with the event and with a reference to the alternate content.

Figure 6:
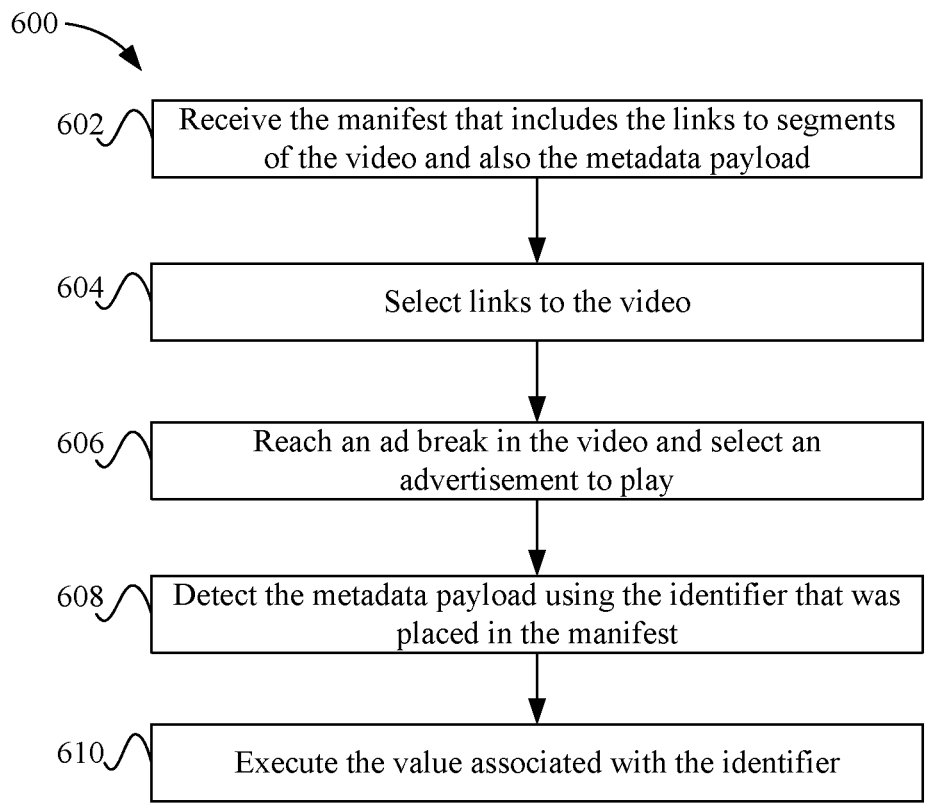
FIG. 6 depicts a simplified flowchart of a method for using a manifest at client device 104 according to one embodiment.

FIG. 6 depicts a simplified flowchart 600 of a method for using a manifest at client device 104 according to one embodiment. At 602, client device 104 receives the manifest that includes the links to segments of the video and also the metadata payload. The manifest may also have links to advertisements inserted at ad breaks in the video. At 604, client device 104 selects links to the video.

At 606, client device 104 reaches an ad break in the video and selects an advertisement to play. At 608, assuming the metadata payload was inserted into the manifest, client device 104 detects the metadata payload using the identifier that was placed in the manifest. Client device 104 may be configured to detect identifiers in the manifest, such as the SERVER_RESPONSE identifier or any of the identifiers described above. Client device 104 may also detect URLs inserted into the manifest with the identifiers.

At 610, client device 104 executes the value associated with the identifier. For example, a path may be associated with the identifier. In one example, if client device 104 plays an advertisement to the end, client device 104 executes a link that records the advertisement was watched to the end.

System

Figure 7:
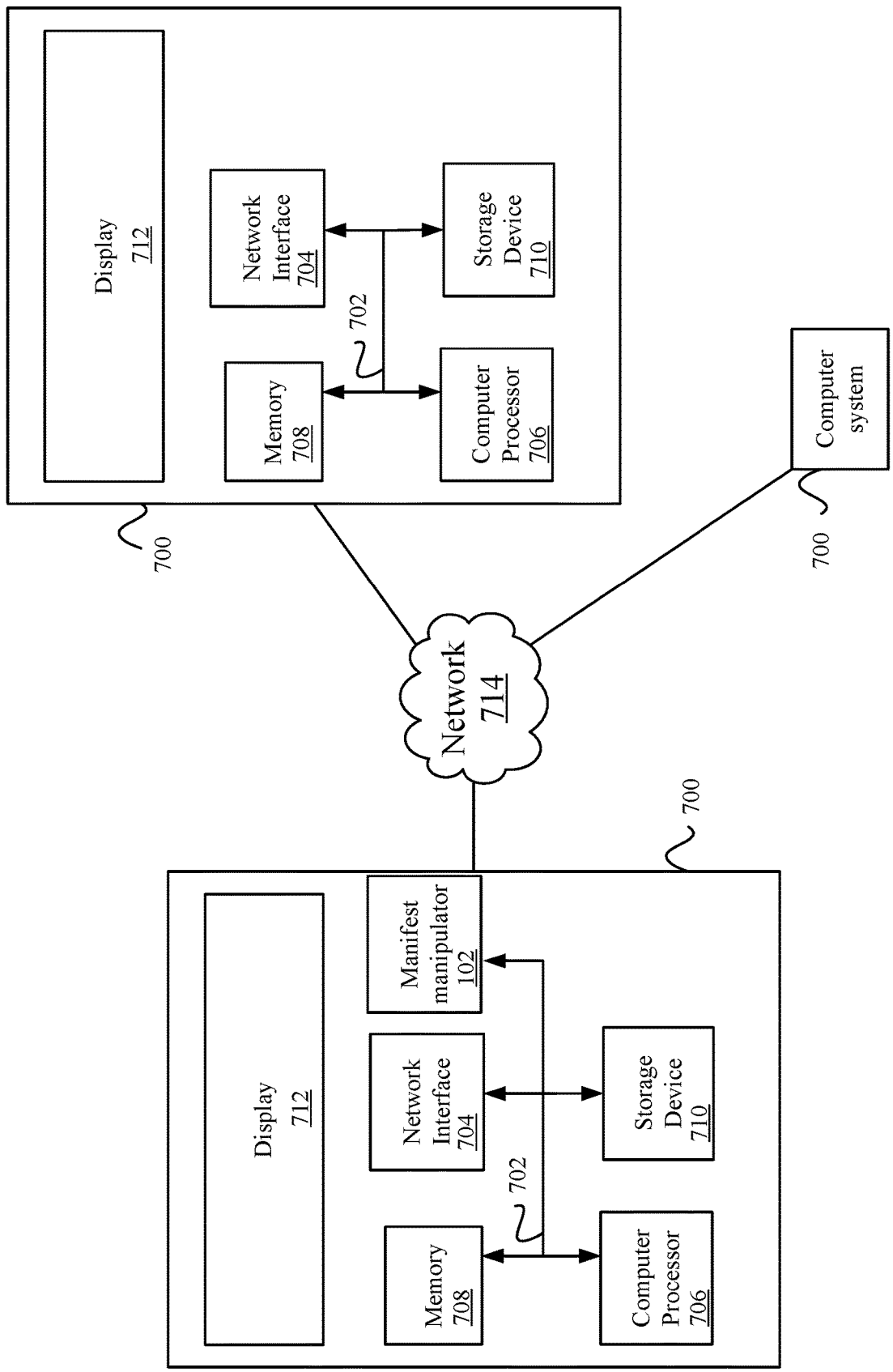
FIG. 7 illustrates an example of a special purpose computer systems configured with the manifest manipulator according to one embodiment.

FIG. 7 illustrates an example of a special purpose computer systems 700-1-700-3 configured with manifest manipulator 102 according to one embodiment. In one embodiment, computer system 700-1 describes manifest manipulator 102. Also, computer system 700-2 describes client device 104. Only one instance of computer system 700 will be described for discussion purposes, but it will be recognized that computer system 700 may be implemented for other entities described above, such as origin server 106.

Computer system 700 includes a bus 702, network interface 704, a computer processor 706, a memory 708, a storage device 710, and a display 712.

Bus 702 may be a communication mechanism for communicating information. Computer processor 706 may execute computer programs stored in memory 708 or storage device 708. Any suitable programming language can be used to implement the routines of particular embodiments including C, C++, Java, assembly language, etc. Different programming techniques can be employed such as procedural or object oriented. The routines can execute on a single computer system 700 or multiple computer systems 700. Further, multiple computer processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The non-transitory computer-readable storage medium contains instructions for controlling a computer system 700 to be configured to perform functions described by particular embodiments. The instructions, when executed by one or more computer processors 706, may be configured to perform that which is described in particular embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of particular embodiments may be distributed across computer systems 700 through network 714.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a manifest for video requested by a client device, the manifest including:
   one or more adaptive bitrate segments of the video from different versions of the video identified in a variant file previously provided to the client device for the client device to use to request one or more of the segments based on conditions detected by the client device, and
   one or more placeholders based on a configuration customized by the client device for editing the manifest to return to said client device, said configuration using identifiers to identify whether to reference an alternate content or metadata payload at the one or more placeholders within the manifest, said identifiers referencing information received from and collected automatically from the client device without user interaction, and at least one of:
   a response from an ad/alternate content server, and/or
   a static configuration of a server-side service,
   wherein each identifier is represented as a syntax with a data source and a value that are variably defined by said client device for customizing by said client device an information from the data source to insert into playback of the video by said client device,
   wherein one or more of the placeholders identifies a position of an event occurring within the manifest,
   wherein at least one of the alternate content or a metadata payload is selectable, based on the identifiers associated with each placeholder, for insertion in the manifest at a respective placeholder position,
   in response to the configuration specifying at least one of the placeholders as a trigger to insert a reference into the manifest, retrieving, by the computing device, said alternate content or said metadata payload based on the identifiers included in said configuration for insertion into playback of the video by said client device;
   dynamically inserting, by the computing device, the selected at least one of the alternate content or the metadata payload into the manifest based on the placeholder; and
   outputting, by the computing device, the edited manifest with the reference to the alternate content and the metadata payload for use by the client device while playing the video.

2. The method of claim 1, wherein:
   the source of the metadata payload is from the client device, and
   the metadata payload is selected from a link sent by the client device.

3. The method of claim 2, wherein the metadata payload is based on a parameter from the link.

4. The method of claim 2, wherein the metadata payload is based on a regular expression for data in the link.

5. The method of claim 1, wherein:
   the source of the metadata payload is from an advertisement engine that selects advertisements for insertion in the manifest, and
   the metadata payload is selected from a response from the advertisement engine when the advertisement engine is called to select the advertisements.

6. The method of claim 5, wherein the metadata payload is based on a path that provides information related to the client device playing an advertisement that was selected by the ad engine.

7. The method of claim 6, wherein the path is an impression tracker for the playing of the advertisement.

8. The method of claim 1, wherein:
   the source of the metadata payload is from a manifest manipulator service, and
   the metadata payload is selected from a configuration of the manifest manipulator service.

9. The method of claim 8, wherein the metadata payload is based on a variable from the configuration.

10. The method of claim 1, wherein:
    the source of the metadata payload is from the manifest, and
    the metadata payload is selected from the manifest that is received for the video.

11. The method of claim 10, wherein the metadata payload is based on a variable from the manifest.

12. The method of claim 1, wherein the configuration specifies name and value pairs that are used to select the placeholder and the source of the metadata payload.

13. The method of claim 1, wherein the configuration specifies at least one of a client device, an advertisement engine, a manifest, and a manifest manipulator service as the source of the metadata payload.

14. The method of claim 1, wherein the placeholder comprises a placement opportunity start placeholder indicating a start of an advertisement break and a placement opportunity end placeholder indicating an end of an advertisement break.

15. The method of claim 1, wherein the placeholder comprises a placement start placeholder indicating a start of an opportunity to insert an advertisement or blackout content as the alternate content and a placement end placeholder indicating an end of an opportunity to insert the advertisement or blackout content as the alternate content.

16. The method of claim 1, wherein the placeholder comprises an end of session placeholder indicating the end of a session.

17. The method of claim 1, wherein the client device selects the metadata payload while playing the video to perform an action specified by the metadata payload.

18. A non-transitory computer-readable storage medium containing instructions, that when executed, control a computer system to be configured for:
    receiving a manifest for video requested by a client device, the manifest including the manifest including:
    one or more adaptive bitrate segments of the video from different versions of the video identified in a variant file previously provided to the client device for the client device to use to request one or more of the segments based on conditions detected by the client device, and one or more placeholders based on a configuration customized by the client device for editing the manifest to return to said client device, said configuration using identifiers to identify whether to reference an alternate content or metadata payload at the one or more placeholders within the manifest, said identifiers referencing a primary server and a backup server, each a source of ad/alternate content, and at least one of:

a response from at least one of the primary server and backup server, a static configuration of a server-side service, information signaled in the manifest received from the client device, and/or information from the client device;

wherein each identifier is represented as a syntax with a data source and a value that are variably defined by said client device for customizing by said client device an information from the data source to insert into playback of the video by said client device, wherein one or more of the placeholders identifies a position of an event occurring within the manifest, wherein at least one of the alternate content or a metadata payload is selectable, based on the identifiers associated with each placeholder, for insertion in the manifest at a respective placeholder position, in response to the configuration specifying at least one of the placeholders as a trigger to insert a reference into the manifest, retrieving said alternate content or metadata payload based on the identifiers included in said configuration for insertion into playback of the video by said client device;

dynamically inserting the selected at least one of the alternate content or the metadata payload into the manifest based on the placeholder; and outputting, by the computing device, the edited manifest with the reference to the alternate content and the metadata payload for use by the client device while playing the video.

19. A method comprising:

receiving, by a computing device, a manifest for video requested by a client device, the manifest including:

one or more adaptive bitrate segments of the video from different versions of the video identified in a variant file previously provided to the client device for the client device to use to request one or more of the segments based on conditions detected by the client device, and one or more placeholders based on a configuration customized by the client device for editing the manifest to return to said client device, said configuration using identifiers to identify whether to reference an alternate content or metadata payload at the one or more placeholders within the manifest, said identifiers referencing at least one of:

a response from an ad/alternate content server, a static configuration of a server-side service, information signaled in the manifest received from the client device, and/or information from the client device;

wherein each identifier is represented as a syntax with a data source and a value that are variably defined by said client device for customizing by said client device an information from the data source to insert into playback of the video by said client device, wherein one or more of the placeholders identifies a position of an event occurring within the manifest, wherein at least one of the alternate content or a metadata payload is selectable, based on the identifiers associated with each placeholder, for insertion in the manifest at a respective placeholder position, parsing, by the computing device, the manifest to recognize a placeholder in the manifest based on a configuration specifying the placeholder as a trigger where said metadata payload is inserted into the manifest, the placeholder indicating where to insert a reference to alternate content into the manifest, the alternate content being inserted into playback of the video;

determining, by the computing device, that the placeholder in the configuration specifies at least one of a client device, an advertisement engine, a manifest, and a manifest manipulator service as a source of the metadata payload;

retrieving, by the computing device, real-time information from at least one of the client device, the advertisement engine, the manifest, and the manifest manipulator service as the metadata payload;

dynamically inserting, by the computing device, the real-time information as the metadata payload into the manifest at a position based on the placeholder, the metadata payload added with an identifier from the configuration that identifies the metadata payload to the client device; and outputting, by the computing device, the manifest with the metadata payload for use by the client device while playing the video.

20. The method of claim 19, wherein the placeholder comprises at least one of:

a placement start placeholder indicating a start of an advertisement break, a placement end placeholder indicating an end of an advertisement break, a placement opportunity start placeholder indicating a start of an opportunity to insert an advertisement, a placement opportunity end placeholder indicating an end of an opportunity to insert an advertisement, and an end of session placeholder indicating the end of a session.

* * * * *